United States Patent [19]
Hayes

[11] Patent Number: 5,764,782
[45] Date of Patent: Jun. 9, 1998

[54] ACOUSTIC REFLECTOR

[76] Inventor: Joseph Francis Hayes, 16 Groongal St., Mayfield, N.S.W. 2304, Australia

[21] Appl. No.: 532,558

[22] PCT Filed: Mar. 23, 1994

[86] PCT No.: PCT/AU94/00146

§ 371 Date: Jun. 10, 1996

§ 102(e) Date: Jun. 10, 1996

[87] PCT Pub. No.: WO94/22274

PCT Pub. Date: Sep. 29, 1994

[30] Foreign Application Priority Data

Mar. 23, 1993 [AU] Australia ................... PL7946

[51] Int. Cl.$^6$ ............................................. H04R 25/00
[52] U.S. Cl. .............. 381/160; 381/188; 381/169; 381/205; 181/155; 181/156; 333/193; 296/180.1
[58] Field of Search ........................... 381/160, 188, 381/156, 190–199; 181/155, 156, 288; 333/193; 296/158, 180.1, 180.2, 180.3, 180.4, 180.5

[56] References Cited

U.S. PATENT DOCUMENTS

| 4,081,626 | 3/1978 | Muggli et al. | |
|---|---|---|---|
| 4,353,046 | 10/1982 | Hartmann | 333/194 |
| 4,395,652 | 7/1983 | Nakanishi | |
| 4,682,808 | 7/1987 | Bitanin | |
| 4,800,983 | 1/1989 | Geren | 181/155 |
| 4,821,839 | 4/1989 | D'Antonio et al. | 181/288 |
| 4,836,329 | 6/1989 | Klayman | 181/155 |
| 4,861,093 | 8/1989 | Chapman | 296/180 |
| 4,964,486 | 10/1990 | D'Antonio et al. | 181/288 |
| 5,108,145 | 4/1992 | Harris | 296/180 |
| 5,401,921 | 3/1995 | D'Antonio et al. | 181/286 |

FOREIGN PATENT DOCUMENTS

| 275195 | 7/1988 | European Pat. Off. |
| 878639 | 11/1981 | U.S.S.R. |
| 2149054 | 6/1985 | United Kingdom |
| 94/02744 | 2/1994 | WIPO |

OTHER PUBLICATIONS

M.R. Schroeder and R.E. Gerlach "Diffuse Sound Reflection Surfaces", 9th ICA, Madrid, Paper D8 (1977) Sep. 3, 1977.

Primary Examiner—Curtis A. Kuntz
Assistant Examiner—Rexford N. Barnie
Attorney, Agent, or Firm—Lappin & Kusmer LLP

[57] ABSTRACT

The surface of an acoustic reflector faces the source, and has a plurality (N) of wells, where N is an odd prime number. Each well has a depth $D_n = (n^2 \text{ rem } N)^*$ unit depth ($0 <= N <= N-1$), governed by a Quadratic Residue Sequence. Acoustic energy directed from the source to the reflector, and reflected along a length direction of the reflector, has substantially equal acoustic energy in all angular directions from the reflector within plus and minus $\pi/2$ from the direction of radiation. The surface above can be used for the surface of a loudspeaker, where either it is the surface of the loudspeaker or has speakers positioned at the bottom of the wells. The surface above can also be used for drag reduction in moving vehicles when it is positioned either at the front or rear of the vehicle.

35 Claims, 6 Drawing Sheets

ACOUSTIC REFLECTOR

TECHNICAL FIELD OF THE INVENTION

The present invention relates to an acoustic reflector, and in particular, to an acoustic reflector that provides a broad angle within which maximal energy is reflected from a source.

BACKGROUND OF THE INVENTION

A conventional loudspeaker radiates acoustic energy directly into a listening environment. Such a direct radiating loudspeaker driver suffers from a high directivity factor. That is, it directs greater amounts of acoustic energy to locations at some angles from the loudspeaker driver than it does to locations at other angles. For optimal "listening", such a conventional loudspeaker requires careful aiming of the loudspeaker relative to the preferred listening point.

A prior art attempt at broadening the optimum listening angle is described in U.S. Pat. No. 4,800,983, issued on Jan. 31, 1989 ("the No. '983 patent"). The No. '983 patent describes acoustic wave "diffractor" labyrinth(s) positioned obliquely in front of sound producing transducer(s). This arrangement is described as causing wide angle dispersion of sound waves projected from the transducer(s) into the labyrinth(s).

A problem with the arrangement described in the No. '983 patent is that the labyrinth and the tweeter will both radiate energy in the solid half space from $\pi/2$ to $-\pi/2$. Since the radiating sound producing transducers are in oblique alignment to the labyrinth, the energy produced by the transducers will interfere with the radiated energy from the labyrinth. This will cause reflected energy to radiate off the sound producing transducers and cause interference to the resultant sound field, and it also reduces the angle of radiation below $\pi$ radians.

SUMMARY OF THE INVENTION

The present invention is an acoustic reflector for reflecting waves from a source. The reflector comprises a surface facing the source. The surface has a plurality (N) of wells, where N is an odd prime number, running along a length direction of the surface. Each well has a depth $D_n=(n^2 \text{ rem } N) *$ unit depth ($0<=n<=N-1$), governed by a Quadratic Residue Sequence. Thus, acoustic energy directed from the source to the reflector, and reflected from the reflector, has substantially equal acoustic energy in all angular directions from the reflector within plus and minus $\pi/2$ from the direction of radiation.

In a further embodiment in accordance with the present invention, the depth of each well is corrected by the variance between a spherical wave from the source and the distance from the surface of the reflector to the source.

In another embodiment of the invention, a reflector has a plurality of wells with each of the wells having depths $D_n=(n^2 \text{ rem } N) *$ unit depth, governed by a Quadratic Residue Sequence, and a radiating source coupled at an extremity of each of the wells.

In a still further embodiment of the invention, a reflector has a plurality of wells where the wells have depths governed by a Quadratic Residue Sequence, and a radiating source is positioned at the extremity of each well.

DETAILED DESCRIPTION OF THE INVENTION

Figures 1, 2A, 3:
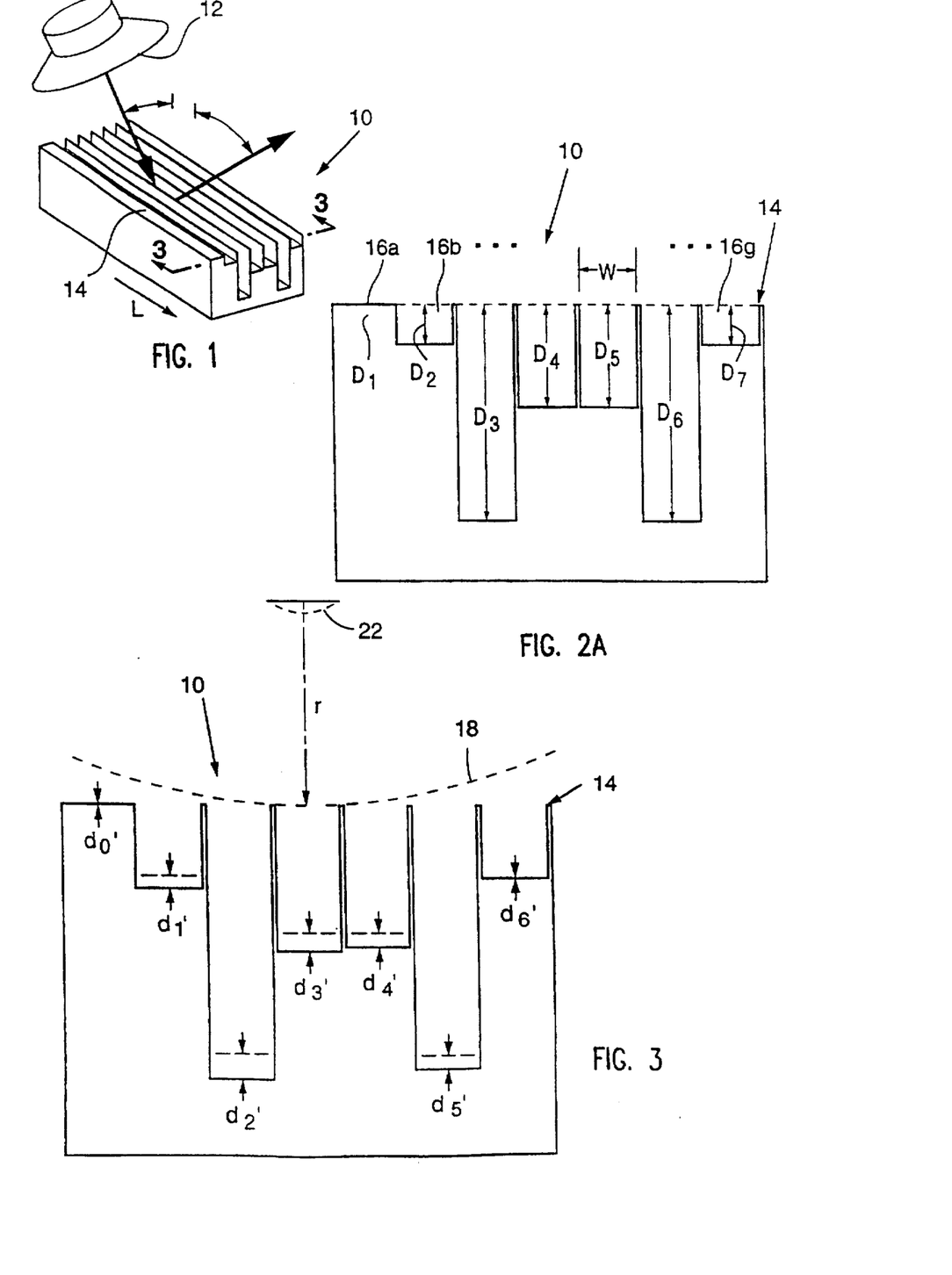
FIG. 1 is a perspective view of an acoustic source in relation to a reflector.
FIG. 2A is a cross-sectional view taken along 3—3 of FIG. 1 of a reflector in accordance with the present invention having wells in the surface, the depths of the wells governed by a Quadratic Residue Sequence.
FIG. 3 is a cross-sectional view taken along 3—3 of FIG. 1, or one embodiment of an improved reflector in accordance with the present invention.

FIG. 1 shows a reflector 10. In a preferred embodiment in accordance with the present invention, acoustic energy from a source 12, such as a loud speaker, is directed to the reflector 10 and is reflected a length direction L from a series of wells 16 formed in a planar surface 14 of the reflector 10 into a listening environment. Each of the wells 16 runs along, and is parallel to, the length L. The depth of each well 16 is governed by a Quadratic Residue Sequence. The reflected acoustic energy has substantially equal acoustic energy in all angular directions from the reflector 10 within plus or minus $\pi/2$ angular direction from the direction of radiation.

Referring to FIG. 2A, a cross-sectional view of the reflector 10 is shown along the line 3—3 shown in FIG. 1. The reflector 10 has N wells 16 of varying depths $D_0$, $D_1, \ldots D_{N-1}$ in the planar surface 14. The reflector 10 shown in FIG. 2A has seven such wells 16a–16g in the planar surface 14. The depths of the wells 16 are determined by applying a mathematical number sequence to predetermine the phase relationship between adjacent elements of radiated acoustical energy. That is, the varying depths of the wells 16 adjust the elements to correct for the phase differences.

One such mathematical number sequence is known as a Quadratic Residue Sequence (QRS). The QRS is a number sequence with a total element length equal to any odd prime number N (e.g., 1, 3, 5, 7, 11, 13, 17, 19, 23, 29 . . . ); N is the number of wells 16 in the surface 14. The individual element solutions are governed by the relationship $s_n = n^2$ rem N (i.e. the remainder resulting when dividing $n^2$ by N)

Table 1 shows the solution to a QRS derived for a sequence having seven elements (i.e. N=7):

TABLE 1

| Element Number (0 < = n < = (N-1)) | Element No. Squared ($n^2$) | $S_n$ $n^2$ rem N |
|---|---|---|
| 0 | 0 | 0 rem 7 = 0 |
| 1 | 1 | 1 rem 7 = 1 |
| 2 | 4 | 4 rem 7 = 4 |
| 3 | 9 | 9 rem 7 = 2 |
| 4 | 16 | 16 rem 7 = 2 |
| 5 | 25 | 25 rem 7 = 4 |
| 6 | 36 | 36 rem 7 = 1 |

It is the property of the QRS that any one period of the sequence can be used. Thus, sequence can start at any number n, or fraction thereof, so long as it resolves one complete cycle of the sequence, i.e. Nw in length (where w is the width of a well). The following Table 2 starts at n=4 and includes n=10.

TABLE 2

| Element Number (0 < = n < = (N-1)) | Element No. Squared ($n^2$) | $s_n$, N = 7 $n^2$ rem N | N = 5 | N = 3 |
|---|---|---|---|---|
| 4 | 16 | 2 | | |
| 5 | 25 | 4 | 4 | |
| 6 | 36 | 1 | 1 | 1 |
| 7 | 49 | 0 | 0 | 0 |
| 8 | 64 | 1 | 1 | 1 |
| 9 | 81 | 4 | 4 | |
| 10 | 100 | 2 | | |

This particular Table 2 is useful in that a reflector having wells with these values are nested within one another with the inner set of wells being the solution to the QRS for a lesser value of N. Thus, the QRS solution for N=5 is 4,1,0,1,4, and for N=3 is 1,0,1. Thus, as the energy of the source focuses in to a narrower beam, another set of wells satisfying the QRS solution is present to diffuse the narrower beam. See FIG. 2B. If a set of solutions $S_n$, for any N, do not suit an application, a constant can be added to each solution $S_n$, and then apply the formula:

$S'_n = (S_n + a)$ rem N, where a is a constant

Thus for the natural solution for N=7 being 0,1,4,2,2,4,1 we can add, e.g. a=3 to each $S_n$ and transform the solution to 3,4,0,5,5,0,4.

The reflector 10 of FIG. 2A has a plurality of wells 16 whose depths are the solutions to the QRS multiplied by some unit depth. That is, the depth of well 0 (16a) is 0; the depth of well 1 (16b), immediately adjacent to well 0 (16a), is 1 * unit depth; the depth of well 2 (16c), immediately adjacent to well 1 (16b), is 4 * unit depth, etc. It is desired that the elements of acoustic energy radiated from the source 12, when they are reflected from the surface 14 having the wells 16, mix in a far field space to exhibit a diffuse sound field. The "perfect" solution to the QRS provides equal acoustic energy in all angular directions from the reflector 10 within plus and minus $\pi/2$ angular direction from the direction of radiation.

The reflector 10 in accordance with the present invention assumed that the acoustic energy from the source 12 is in the form of a planar wave. However, acoustic drivers rarely produce planar waves. In fact, most acoustic drivers, particularly dome tweeters, produce spherical waves. Therefore, the wells 16 in the planar surface 14 of the reflector 10 are not of the perfect depths to phase correct the elements of acoustic energy radiated from most acoustic drivers.

FIG. 3 shows a further embodiment of an acoustic reflector in accordance with the present invention. Some of the distances shown in FIG. 3 have been exaggerated for clarity of explanation. The planar surface 14 (shown by a dot-dash line) of the reflector 10 of FIG. 1 is shown along the section of the line 3—3. As with the reflector of FIG. 2A, the planar surface 14 has N wells 16 of varying depths $D_0$, $D_1$, . . . $D_{N-1}$. The depths $D_0$, $D_1$, . . . $D_{N-1}$ are shown by the dashed lines in FIG. 3. The depths of the wells 16 are governed by the solution to the Quadratic Residue Sequence for N=7.

However, the reflector 10 in accordance with the present invention corrects for the variance $d_n$ between the distance travelled by a spherical wave 18 from the source and the distance travelled by a planar wave. The solid lines in FIG. 3 show the corrected well depths.

It can be seen that the distance travelled by the radiating elements of the spherical wave 18, for any element other than the one associated with the center well 16d, is greater than the distance travelled by a planar wave front. The distance travelled by a particular element of a spherical wave is a combination of the distance from the source to the surface and the depth of the associated well. That is, where "r" denotes the radius from the source to the reflector and $d_n$ is the correction distance, the distance travelled by a spherical wave element is:

$dist_{spherical}(n) = r + d_n + 2 * D_n$, whereas the distance travelled by a planar wave is:

$dist_{planar}(n) = r + 2 * D_n$.

The extra distance $d_n$ is determined geometrically to be:

$d_n = \text{sqrt}[r^2 + \{[n-(N/2)]*w\}^2] - r$, where w is the width of the wells.

An alternative to using the distance from the source is a group delay measurement to indicate the arrival time of a reference wavefront to the center of each element. The arrival time to each element is measured. The timing difference between the arrival time to each element and the arrival time to a reference element, such as the center element, can be computed. These timing differences, when related to the speed of sound, can be changed to distance. This is advantageous when the actual distance from the source is not exactly the path taken by the wave front. In some situations, source phasing and other effects can cause uneven time delays in the wavefront.

One skilled in the art will recognize that it is only the relative depths of the wells that need be varied to correct for the difference between the spherical wave and the planar wave. The correction distance d'(n) for a particular well, relative to the n=0 well, is $$d'(n) = \frac{d_0 - (sqrt|r^2 + \{[n - (N/2)]*w\}^2| - r)}{2}$$

In the embodiment shown in FIG. 3, each of the wells has a depth $D_n$, plus the correction distance $d'_n$.

Figure 2B:
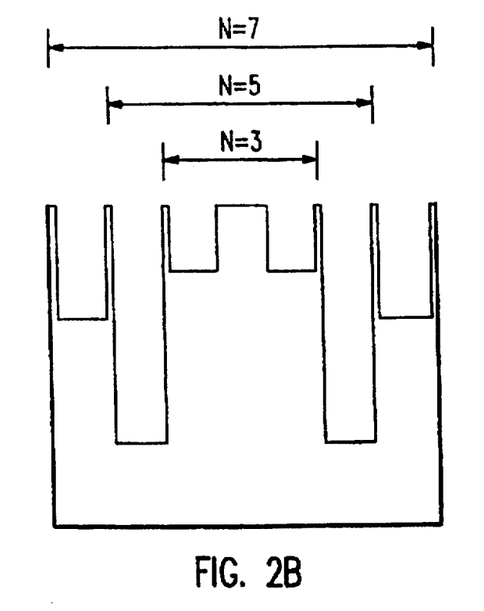
FIG. 2B is a cross-sectional view of another embodiment of a reflector in accordance with the present invention having a series of nested wells, with each nest governed by a Quadratic Residue Sequence.

It should be noted that with the reflectors shown in FIGS. 1–3, the wells may be non-linear below the reflector surface and the reflectors will still provide a broad angle of maximum reflected energy.

Figure 4:
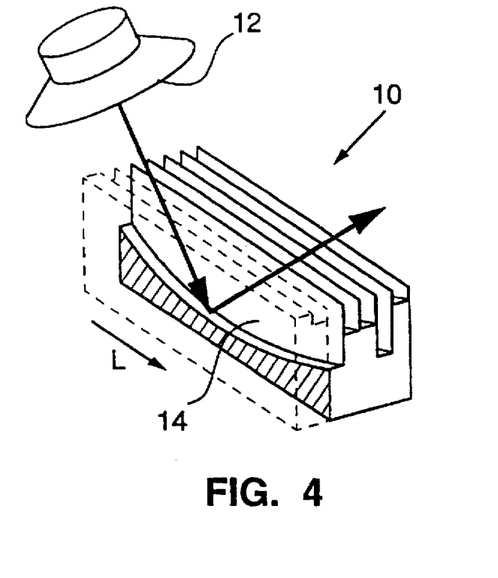
FIG. 4 is a perspective cutaway view of the embodiment of FIG. 1, where the well bottoms are concave.
Figure 5:
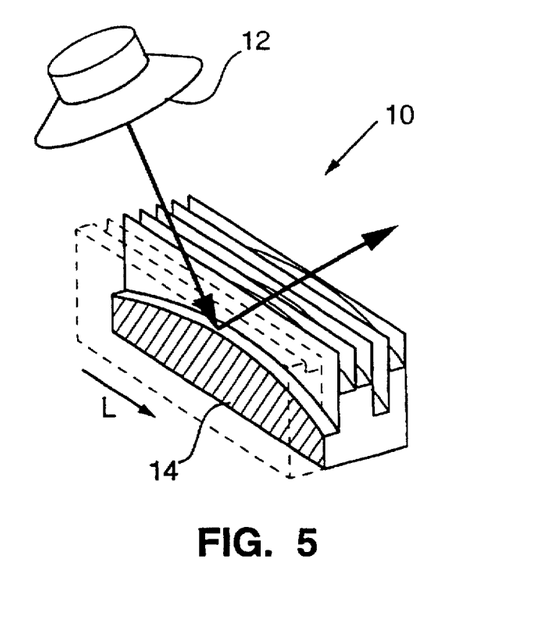
FIG. 5 is a perspective cutaway view of the embodiment of FIG. 1, where the well bottoms are convex.

Furthermore, as shown in FIG. 4, the bottom of each well may be concave so as to transform the spherical shape of an element radiated into a particular well into a linear element radiated out of the well. That is, a correction is made for the difference that occurs when the energy radiated into a particular well enters in the same plane but radiates from the bottom of the well out of plane, due to path difference geometry. By contrast, the bottom of each well may be convex, as shown in FIG. 5, so as to produce a broader pattern of energy radiated from the wells.

It is preferred that the speaker driver 12 be at 45 degrees with respect to the length direction L of the wells in the diffusing surface 14, and in the plane of the depths of the wells. When the direction of acoustic radiation from the speaker driver 12 is at such an angle with respect to the diffusing surface and the wells, driver interference with the resultant diffuse far field pressure wave is minimized, and the path difference between the particular segments to the far field is maximized.

Furthermore, since it is the object of the reflector embodiment to reflect sound from a speaker driver onto the reflector surface, and reflect a resultant sound field into a listening environment, it is particularly important that no stray paths exist for sound radiation directly from the speaker driver into the listening environment.

It is therefore preferable to use speaker drivers that concentrate their near-field energy directly onto the reflector surface. That is, a speaker driver with a very wide sound radiation pattern may actually radiate sound directly to the listener without first reflecting off the reflector. This will cause frequency dependent phase cancellation and also upset the group delay alignment in this band of frequencies. The speaker driver can incorporate means for specifically diverting equal energy onto the wells.

The useful frequency bandwidth over which the reflector 10 is effective is governed by two main design variables, the unit depth and the element width. The lowest useful frequency is controlled by the amount of path difference introduced by the various well depths. The highest useful frequency is controlled by the width of the wells.

To control the low frequency design frequency of the diffusor, the unit depth is set to equal 1/N times the design wavelength. For example, if the unit depth is 10 millimeters, and N=7, then the design wavelength is given by:

$$\lambda_0 = N \times 10 \text{ millimeters} = 70 \text{ millimeters}$$

From this, the design frequency is calculated:

$$\begin{aligned}
f_0 &= c/\lambda_0 \\
&= 343/(70 \times 10^{-3}) \\
&= 4.9 \text{ kHz (or 3.46 kHz when the reflective angle} \\
&\quad \text{of 45 degrees is considered as extra path length)}
\end{aligned}$$

It has been observed that the reflector 10 works to $\lambda_0/2$. The highest frequency at which the reflector is effective, the cutoff frequency, is governed by the individual well width, w, or the relation to the design frequency. Using the previous example, if the well width is 10 millimeters then the cutoff frequency is given by;

$$\begin{aligned}
\lambda_{high} &= w \times 2 \\
&= 20 \text{ millimeters}
\end{aligned}$$

And thus the frequency is given by:

$$\begin{aligned}
f_{high} &= c/\lambda_{high} \\
&= 343/(20 \times 10^{-3}) \\
&= 17.15 \text{ kHz}
\end{aligned}$$

Another factor that limits the high frequency effectiveness is that the sequence does not work at a frequency of (N−1) times the design frequency. That is, still using the numbers of the previous example, $$\begin{aligned}
\lambda_{high} &= \lambda_0/(N-1) \\
\lambda_0 &= 70 \text{ mm} \\
\text{thus } \lambda_{high} &= 70 \text{ mm}/6 \\
&= 12.67 \text{ mm} \\
\text{thus } f_{high} &= 343/\lambda_{high} \\
&= 343/12.67 \text{ mm} \\
&= 29.4 \text{ kHz (or 20.8 kHz when the reflection angle of} \\
&\quad \text{45 degrees is considered as extra path length)}
\end{aligned}$$

In this example, cutoff frequency governed by 2 w is less the lessor of the two limiting frequencies and is thus the actual high frequency cut off point. Therefore, the lower of the two frequencies will be the cutoff frequency.

At the design frequency the sound field energy is uniform (omni directional) over a solid angle of 180 degrees. At a frequency of approximately 3 times the design frequency the sound field resembles an omni-directional wave front. As the frequency is increased from one half of the design frequency to the cutoff frequency, the sound field goes through a series of multiple sound power lobe formations, each time taking on an effectively retrained sound field response within a small tolerance of equitably distributed omni directional energy response. Thus, the broadband frequency response of this reflector can best be described as an omni-diffuse sound field. The greater the signal frequency above the design frequency the more perfectly it resembles an omni-directional wave front for both the sound pressure and sound intensity wave.

Figure 6A:
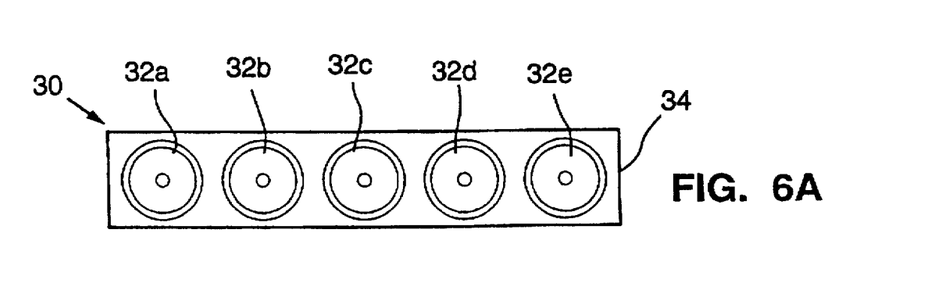
FIG. 6A is a plan view of an embodiment in accordance with the present invention wherein acoustic sources are placed within wells whose depths are governed by a Quadratic Residue Sequence.
Figure 6B:
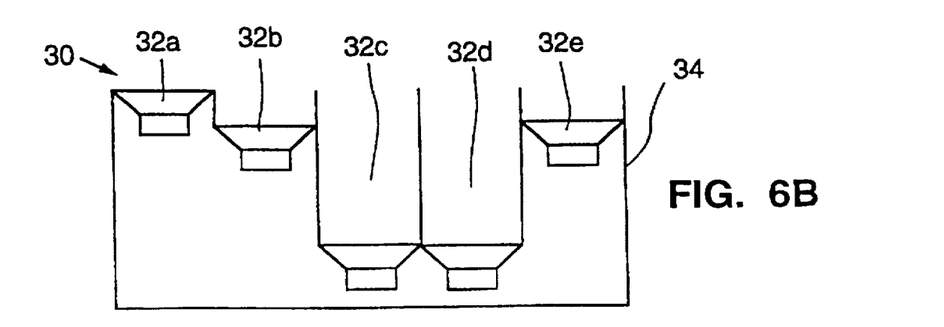
FIG. 6B is a cross-sectional view of the embodiment of FIG. 6A.

FIG. 6A shows a plan view of a one-dimensional cluster 30 of 5 radiating drivers 32a–32e mounted in a surface 34 in accordance with a further embodiment of the present invention. FIG. 6B shows the embodiment of FIG. 6A, in cross-section. The individual set-back depths of the speaker driver units are determined by the solution to the Quadratic Residue Array with N=5. When the unit depth is equal to 75 mm, the solutions are as listed below in Table 3

TABLE 3

Solutions for a low frequency Quadratic Residue Driver Array.

| Element Number | $S_n$ | Depth (Unit = 75 mm) |
|---|---|---|
| 0 | 0 | 0 mm |
| 1 | 1 | 75 mm |
| 2 | 4 | 300 mm |
| 3 | 4 | 300 mm |
| 4 | 1 | 75 mm |

The speakers drivers 32b, 32c, 32d and 32e of FIG. 6B each drive a small load due to the column of air, effectively mass loading the driver. Since speaker driver 32a is mounted flush with the surface, it does not experience the extra mass loading effect. Mass loading causes the loaded drivers to experience changes in both resonant frequency and in sensitivity. The change in resonant frequency causes large differences in driver electrical loading, whether the drivers are wired in series or in parallel. The change in sensitivity will causes the quadratic residue sequence to falter due to amplitude variations between the sequence elements.

To compensate for the air loading, a complimentary mechanical mass may be added to each individual speaker driver such that each speaker driver 32a–32e all have the equal mass loading, either from the air column, the added mechanical mass, or a combination of the two. Thus, the driver resonant frequencies will be equal, so they can be wired either in series or in parallel, and the sensitivity of each quadratic residue sequence element will be equal.

The effective mass of the air column can be computed either by calculating it from the density and volume of air in each well, or by observing the shift in resonant frequency of the mass loaded drivers.

Figure 6C:
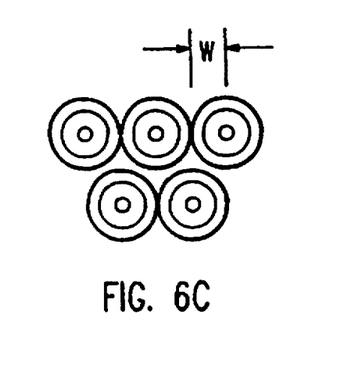
FIG. 6C is a plan view of another embodiment of the device shown in FIGS. 6A and 6B, wherein the acoustic sources are placed within wells aligned in a plurality of rows.

Referring to FIG. 6C there is shown a plan view of another embodiment of the reflector shown in FIGS. 6A and 6B. The 5×1 matrix of speaker drivers 32(a–e) of FIGS. 6A and 6B can be compressed so as to double the high frequency cut-off of the sequence. The n=odd drivers 32(a–e) are located between the n=even drivers but offset by one row. This vertical error is very small in the far field and the compressed cluster acts like a single 5×1 cluster. The width between adjacent speaker drivers is halved such that the cutoff frequency is then doubled.

Figure 7:
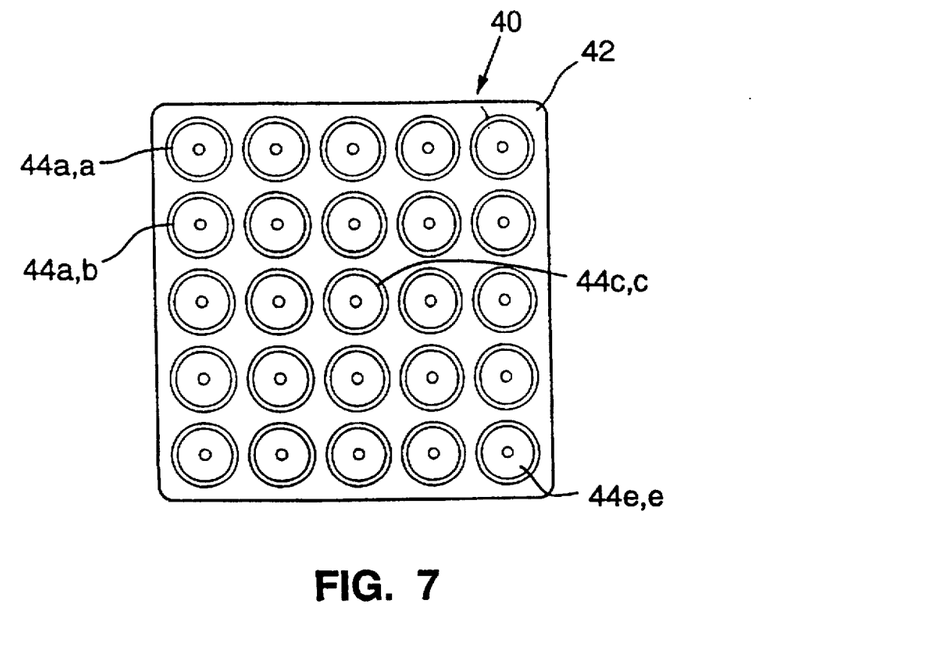
FIG. 7 is a cross-sectional view of an enhancement of the embodiment of FIG. 6A, wherein the wells are arranged in a two-dimensional matrix.

FIG. 7 shows an elevation of a five by five matrix cluster 40 of speaker drivers 44aa, . . . 44e,e mounted in a surface 42 that form a two dimensional omni-diffuse sound source. In a preferred embodiment, only low and mid range frequency drivers are employed, since it is difficult to fabricate high frequency drivers narrow enough to be grouped together in such a configuration.

The design frequency formulae and cutoff frequencies are as previously described for the reflector embodiment. However, with the direct driver embodiments, the low frequency effectiveness tends to stop closer to the design frequency than with the reflector embodiments.

As a particular example of the matrix embodiment of FIG. 7, using 100 millimeter diameter drivers spaced 110 millimeters apart, and with a 100 millimeter unit depth in a five by five matrix, an omni-diffuse sound source is produced which is effective from 700 Hz to 1600 Hz. Thus, it can be seen that this matrix embodiment is particularly useful for Public Address system applications.

As previously stated for the previous descriptions, this two dimensional reflector can be utilized in a reflector system as described earlier.

An error distance can be added or subtracted into the length of each element so that no mass loading would then be required. This lends itself to producing a compromised version of the embodiment where sensitivity can be effectively adjusted by moving the cycle timing of the phase relationship of the signal supplied by each driver. Although this technique is not perfect, it can be useful due to the ease of production. However, the unit cannot be used at low frequencies around the resonant frequency of the drivers as the large loading errors could cause premature driver failure under large loads. Thus, it works only above the resonant frequency of the drivers.

As previously stated for the previous descriptions, this cycle timing adjustment can be utilised in a reflector system as described earlier.

The element depths for a matrix embodiment having N×N wells 44, the well depths are given by:

$$s(ij)=(i^2+j^2) \text{ rem } N, \text{ where N is an odd prime}$$

Like the drivers in the embodiment of FIGS. 6A and 6B, the speaker drivers 44(a–e) in the N×N cluster can be mass-compensated.

Figure 8:
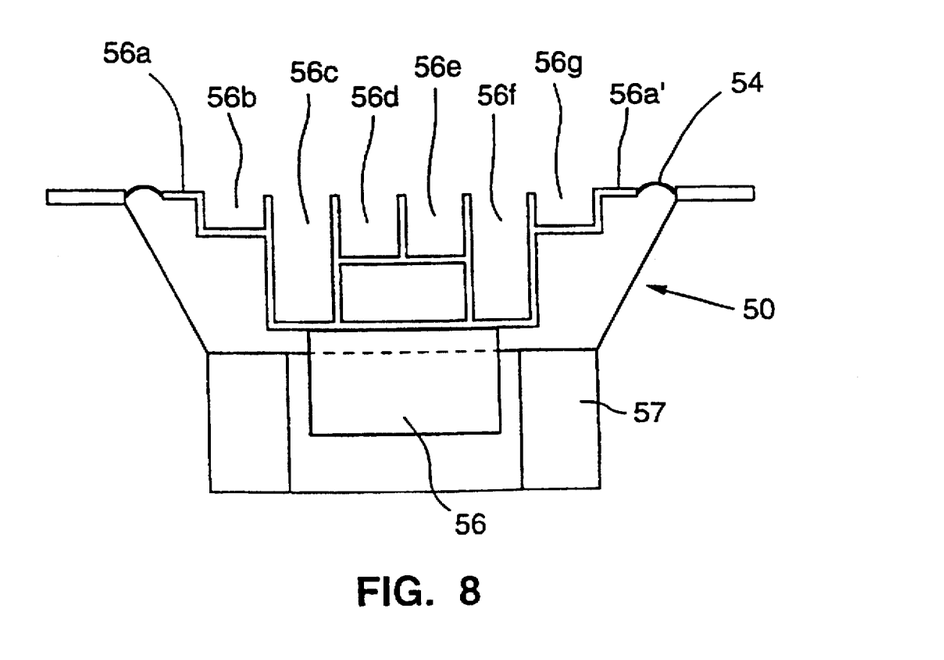
FIG. 8 is a cross-sectional view of a further embodiment in accordance with the present invention wherein an acoustic driver is coupled to a surface having wells, and the depths of the wells are governed by a Quadratic Residue Sequence.

FIG. 8 shows a loudspeaker 50 in accordance with a further embodiment of the invention. The surface 54 has a plurality of wells whose depth is determined by a Quadratic Residue Sequence, and the surface 54 is driven by a driver 56. The driver 56 is shown in FIG. 8 as being vibrated by a magnet 57, as is well known in the art. As shown in FIG. 8, the n=0 well 56a may be split between opposite ends of the surface 54, each of the wells 56(a–g) and 56a' being a portion of the unit width w, without affecting the directional properties of the loudspeaker 50. This may be done, for example, to make the loudspeaker symmetrical, and therefore more visually pleasing.

As previously stated for the previous descriptions, a well may be split between opposite ends of the surface of the reflector system described earlier.

The embodiment of FIG. 8 exhibits the same benefits of omni-directionality previously identified with the other embodiments of the invention. Additionally, the embodiment of FIG. 8 can be easily integrated into conventional loudspeaker designs. Furthermore, as with the other embodiments of the invention, the surface 24 may have wells in one or two dimensions.

Figure 9:
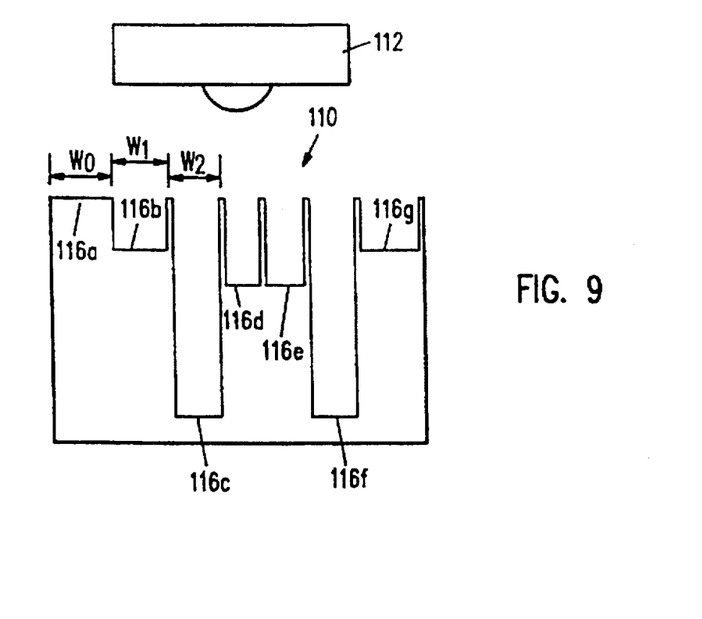
FIG. 9 is a cross-sectional view of another embodiment of a reflector in accordance with the present invention having wells in the surface, the depths of the wells governed by a Quadratic Residue Sequence, but having variable widths.

Referring to FIG. 9 there is shown a cross sectional view of another embodiment of a reflector 110 of the present invention. The reflector 110 is similar to the reflector 10, having a plurality of wells 116(a–g) satisfying the Quadratic Residue Sequence. However, each of the wells 116(a–g) has a width which is not constant. Thus the width of well 116a, $W_0$ is different from the width of well 116b, $W_1$ which is different from the width of well 116c, $W_2$, etc. Similar to the reflector 10, the reflector 110 faces a source 112 of acoustic energy, such as a loud speaker. The reflector 110 is particularly useful where the source radiates acoustic energy having variations in amplitude. Thus, depending upon the magnitude of the amplitude, the widths $W_0$, $W_1$, $W_2$, etc. of each of the wells 116(a–g) can be varied to compensate to achieve equal energy from each element in the QRS.

Figure 10:
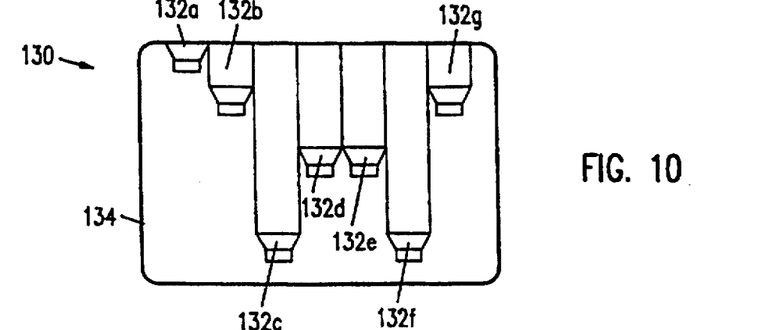
FIG. 10 is a cross sectional view of an embodiment in accordance with the present invention wherein microphones are placed within wells whose depths are governed by a Quadratic Residue Sequence.
Figure 11:
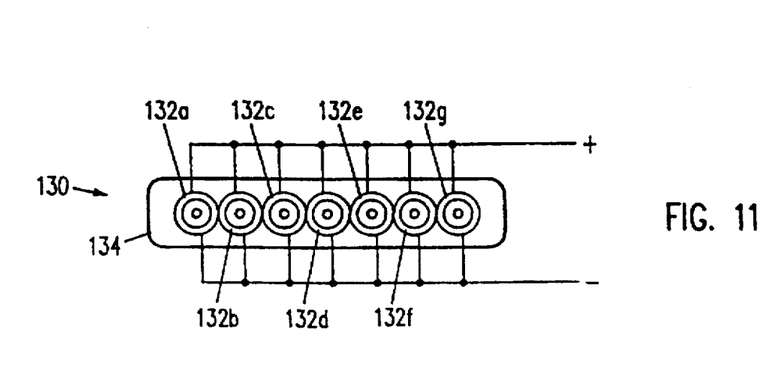
FIG. 11 is a plan view of the embodiment of FIG. 10.

Referring to FIG. 10 there is shown a cross sectional view of another embodiment of a reflector 130 having a plurality of wells, whose depths are governed by a Quadratic Residue Sequence, and having a plurality (N) of microphones 132 (a–g), with one microphone 132 in each of the wells. Similar to the embodiment of the reflector 30 shown and described in FIG. 6(A–B), the collection of N microphones 132 can be arranged in a N×1 array (as shown in FIG. 6A) or in a N×N array as shown in FIG. 7. The plurality of microphones 132 are arranged to provide a constant energy transducer. All design formulas are as for the speaker cluster embodiment, described heretofore, except the speaker drivers are replaced by microphone elements. For a 20 kHz microphone width w, a 8.5 millimeter element can be used. To extend the lower frequency, it is recommended to use greater values of N and make w the same as (N−1) times the design frequency. Furthermore, each of the microphone elements can include a mass compensation element to balance for air loading on each element, similar to the speaker cluster embodiment, described heretofore. The microphone elements 132 are electrically connected in parallel if they are acting as current sources, or in series if they are acting as voltage sources.

As previously stated for the previous descriptions, the error correction technique described in the reflector and cluster embodiments can be utilized in a microphone system as described here.

Figure 12:
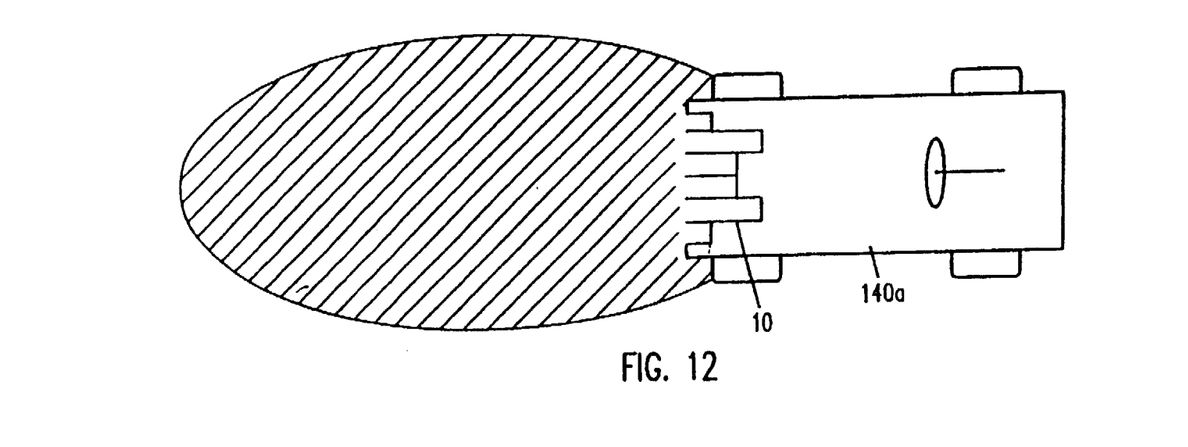
FIG. 12 is a top view of a reflector of the present invention used with a moving automobile, to conserve energy radiated by reducing the wave motion in the air caused by the moving vehicle.
Figure 13:
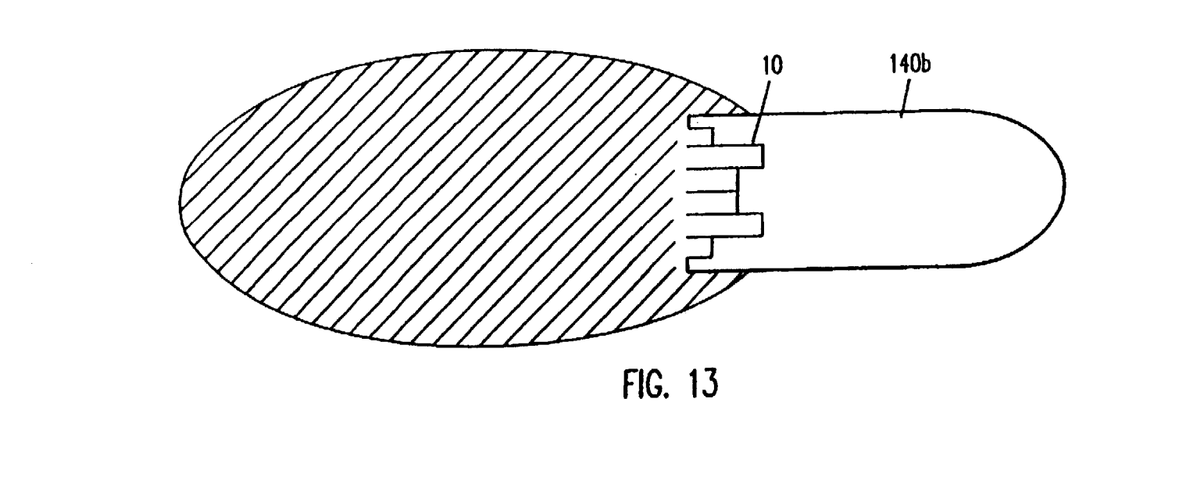
FIG. 13 is a top view of a reflector of the present invention used with a moving boat, to conserve energy radiated by reducing the wave motion in the water caused by the moving boat.

Referring to FIGS. 12 and 13 there is shown a top view of a reflector of the present invention used with a moving vehicle or boat (140a, 140b), to transfer energy without loss by diffusing the wave motion in the fluid (air in FIG. 12, and water in FIG. 13) through which the moving vehicle or boat 140a, 140b passed, i.e. the losses in the wake of the fluid can be reduced. The reflector 10 or 110 can be positioned to the rear of the moving vehicle or boat, 140a, 140b, which passes through a fluid. Energy, which is normally lost when it is turned into heat can be saved, resulting in a conservation of energy. Further, the motion of the fluid, i.e. the wake, can be reduced, thereby reducing environmental impact of a vehicle moving through a fluid.

The reflector 10 or 110 could also be positioned on the front of the vehicle; illustruated in FIGS. 12 and 13 such that the vehicle can move in a direction and pass through a diffuse wake created by the reflector surface positioned in front of the vehicle or boat 140a, 140b. As a consequence, the vehicle 140a, 140b would benefit from reduced motional resistance presented by the diffuse wake in which it moves.

What is claimed is:

1. An acoustic reflector for reflecting acoustic waves radiated from a source, said reflector comprising:

a surface facing the source having a plurality (N, where N is an odd prime number) of wells each well having a depth $$D_n = (n^2 \text{ rem } N) * \text{unit depth}, 0 <= N <= N-1,$$

wherein the surface has a length direction, the wells have bottoms, and the wells are, at the bottoms, parallel to one another in the length direction, and the bottoms of at least some of the wells are convex.

2. An acoustic reflector for reflecting acoustic waves radiated from a source, said reflector comprising:

a surface facing the source having a plurality (N, where N is an odd prime number) of wells each well having a depth $$D_n = (n^2 \text{ rem } N) * \text{unit depth}, 0 <= N <= N-1,$$

wherein the surface has a length direction, the wells have bottoms, and the wells are, at the bottoms, parallel to one another in the length direction, and the bottoms of at least some of the wells are concave.

3. The reflector of claims 1 or 2, wherein the surface has a length direction and the wells are, at the surface, parallel to one another in the length direction, and the surface is oriented with respect to the source such that the acoustic waves from the source and the length direction form an acute angle in a plane parallel to the depth.

4. The reflector of claims 1 or 2, wherein the wells are non-linear below the surface.

5. The reflector of claims 1 or 2, wherein each of the wells has the same width.

6. The reflector of claims 1 or 2, wherein each of the wells has a different width.

7. An acoustic reflector for reflecting substantially spherical acoustic waves radiated from a source, said reflector comprising:

a surface facing said source having a plurality I, where (N, is an odd prime number) of wells, each well having a depth $$D_n = (n^2 \text{ rem } N) * \text{unit depth}$$

for $0 <= n < N-1$, and each well having means for correcting the variance between the spherical wave from the source and the distance of the surface of the well from the source.

8. The reflector of claim 7, wherein the surface has a length direction and the wells are parallel to one another in the length direction, and the surface is oriented with respect to the source such that the acoustic waves from the source and the length direction form an acute angle in a plane parallel to the depth.

9. The reflector of claim 7, wherein said surface is substantially planar and said means for correcting each well is the depth of each well adjusted by a distance $$d'(n) = \frac{d_0 - (sqrt[r^2 + \{[n-(N/2)]*w\}^2] - r)}{2} * \text{unit depth}$$

where w is the width of the wells.

10. The reflector of claim 9, wherein the plurality of N wells are adjacent and contiguous to one another.

11. The reflector of claim 10, wherein the n used to calculate the depth $D_n$ of adjacent contiguous wells differs by 1 or more.

12. An acoustic reflector for reflecting non-planar acoustic waves radiated from a source, said reflector comprising:

a surface facing said source having a plurality N, where N is an odd prime number) of wells, each well having a depth $$D_n = (n^2 \text{ rem } N) * \text{unit depth}$$

for $0 < n <= N-1$, and each well having means for correcting the variance between the non-planar wave from the source and the distance of the surface of the well from the source.

13. The reflector of claim 7, wherein the surface has a length direction, the wells have bottoms, and the wells are, at the bottoms, parallel to one another in the length direction, and the bottoms of at least some of the wells are convex.

14. The reflector of claim 7, wherein the surface has a length direction, the wells have bottoms, and the wells are, at the bottoms, parallel to one another in the length direction, and the bottoms of at least some of the wells are concave.

15. The reflector of claim 7, wherein the wells are non-linear below the surface.

16. The reflector of claim 7, wherein said correcting means further comprising means for measuring the time of arrival of a reference wavefront to the center of each well, and for determining the timing difference between the time of arrival to each well from the time of arrival to the reference well, and means for converting the timing difference into distance.

17. A loudspeaker system comprising:

a surface having a plurality (N, where N is a prime number) of wells; and a plurality (N) of radiating drivers, each radiating driver being within a separate well at a depth $Dn=(n^2 \text{ rem } N)$ * unit depth, for $0<=n<=N-1$.

18. A loudspeaker system as in claim 17, wherein each radiating driver is mass-corrected for the mass of a volume of air within each driver's associated well.

19. A loudspeaker system as in claim 17, further comprising:

an enclosure surrounding said wells.

20. A loudspeaker system as in claim 17, wherein said plurality of wells are aligned in a single line.

21. A loudspeaker system as in claim 17, wherein said plurality of wells are aligned in a plurality of lines.

22. A loudspeaker system as in claim 17, further comprising means for increasing the high frequency cutoff of said loudspeaker system.

23. A loudspeaker system of claim 22, wherein said increasing means comprises said plurality of wells being aligned in a plurality of lines.

24. A loudspeaker system comprising:

a surface having a plurality ($N^2$, where N is a prime number) of wells arranged in an N×N matrix; and a plurality ($N^2$) of radiating sources arranged in an N×N matrix, each source in a well at a depth governed by $D_{ij}=[(i^2+j^2) \text{ rem } N]$ * unit depth.

25. A loudspeaker system as in claim 24, further comprising means for correcting the mass of each radiating source and its associated volume of air for uniformly loading the mass for all sources.

26. A loudspeaker system as in claim 25, wherein said correcting means further comprising mass added to each source.

27. A loudspeaker system as in claim 24, further comprising an adjustment distance to the depth of each well, and means for controlling the phase relationship of each radiating source, whereby no mass loading is required.

28. A loudspeaker system as in claim 27 wherein each source is driven at a frequency above its resonant frequency.

29. A loudspeaker comprising:

a surface having a plurality (N, where N is an odd prime number) of wells, each well having a bottom at a depth $$D_n=(n^2 \text{ rem } N) * \text{unit depth, for } 0<n<N-1; \text{ and}$$

a driver coupled to the bottoms of the wells.

30. A loudspeaker comprising:

a surface having a plurality ($N^2$) of wells arranged in an N×N matrix, each well having depth governed by $$D_{ij}=[(i^2+j^2) \text{ rem } N] * \text{unit depth}$$

for $0<=i<=N-1$ and $0<=j<=N-1$; and a driver coupled to the surface.

31. A constant energy transducer system comprising:

a surface having a plurality (N, where N is a prime number) of wells; and a plurality (N) of transducer means, each transducer means being within a separate well at a depth $Dn=(n^2 \text{ rem } N)$ * unit depth, for $0<=n<=N-1$.

32. A transducer system as in claim 31, wherein each transducer means is mass-corrected for the mass of a volume of air within each transducer means' associated well.

33. A transducer system as in claim 31, further comprising:

an enclosure surrounding said wells.

34. A transducer system comprising:

a surface having a plurality ($N^2$, where N is a prime number) of wells arranged in an N×N matrix; and a plurality ($N^2$) of transducer means arranged in an N×N matrix, each transducer means a depth governed by $D_{ij}=[(i^2+j^2) \text{ rem } N]$ * unit depth.

35. A transducer system as in claim 34, wherein each transducer means is mass-corrected by an amount such that in addition to the mass of a volume of air within each of the transducer means' associated well, a uniform mass loading results for all transducer means.

* * * * *